United States Patent [19]

Varner et al.

[11] Patent Number: 4,938,435
[45] Date of Patent: Jul. 3, 1990

[54] PERSONNEL LOWERING DEVICE

[75] Inventors: Horace M. Varner; Ernest L. Stech, both of Littleton, Colo.

[73] Assignee: Frost Engineering Development Corporation, Englewood, Colo.

[21] Appl. No.: 292,483

[22] Filed: Dec. 30, 1988

[51] Int. Cl.$^5$ ............................................. B64D 17/78
[52] U.S. Cl. ................................... 244/142; 188/184; 188/654; 182/231; 182/5; 244/138 R
[58] Field of Search ............... 188/184, 65.4, 65.1, 188/188; 182/231–240, 5, 6, 7; 244/138 R, 142

[56] References Cited

U.S. PATENT DOCUMENTS

| | | | |
|---|---|---|---|
| 656,507 | 8/1900 | Brown | 182/6 |
| 4,063,615 | 12/1977 | Knepp | 182/5 |
| 4,493,396 | 1/1985 | Borgie | 182/233 |
| 4,640,388 | 2/1987 | Walborn | 182/231 |
| 4,645,034 | 2/1987 | Griffith | 182/5 |

Primary Examiner—Galen Barefoot

[57] ABSTRACT

A personnel lowering or descent control device. The device includes a housing adapted to be secured to a person intending to descend from a higher to a lower elevation, and containing a line adapted to be secured at one end to a fixed point at said higher elevation. The line is wound on a reel rotatably mounted in said housing. A brake assembly, including a centrifugal brake controls the rate of rotation of said reel and thereby the rate of descent. A mechanical brake on said housing provides a manual control of the rate of rotation of the line supply reel. The descent line is trained on a plurality of capstans mounted within the housing for absorbing energy and providing a capstan ratio effective to reduce applied line tension to slow the descent of an object supported by the said descent device.

11 Claims, 4 Drawing Sheets

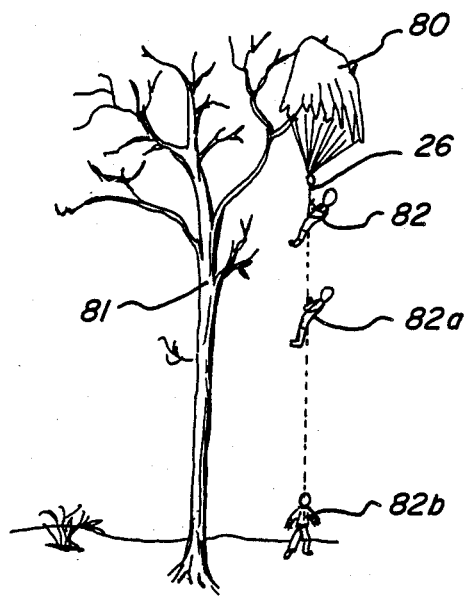
Fig_1
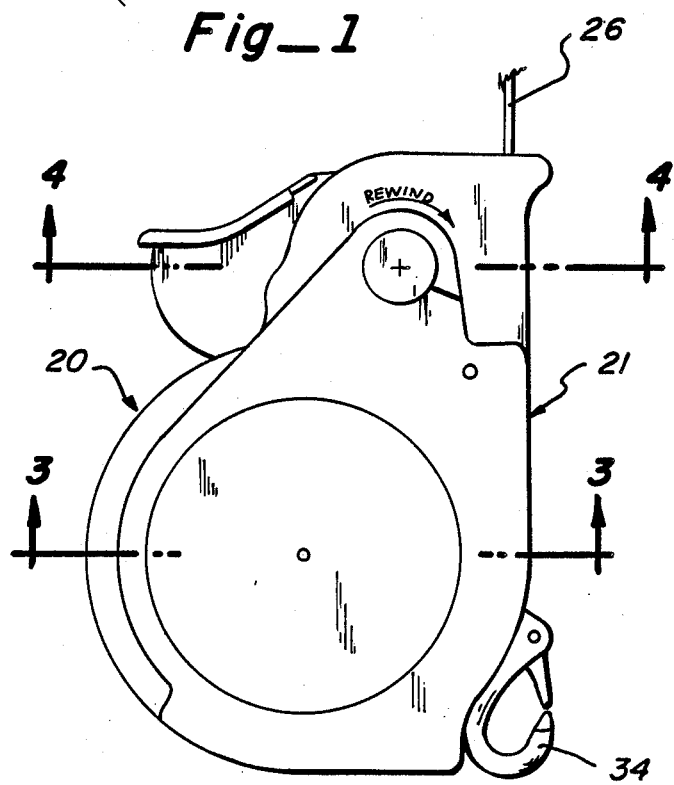
Fig_2

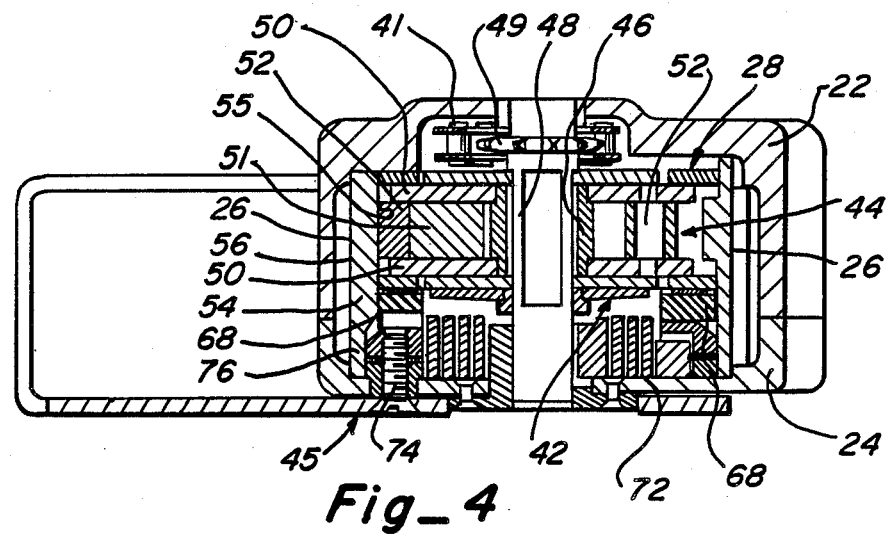
Fig_4
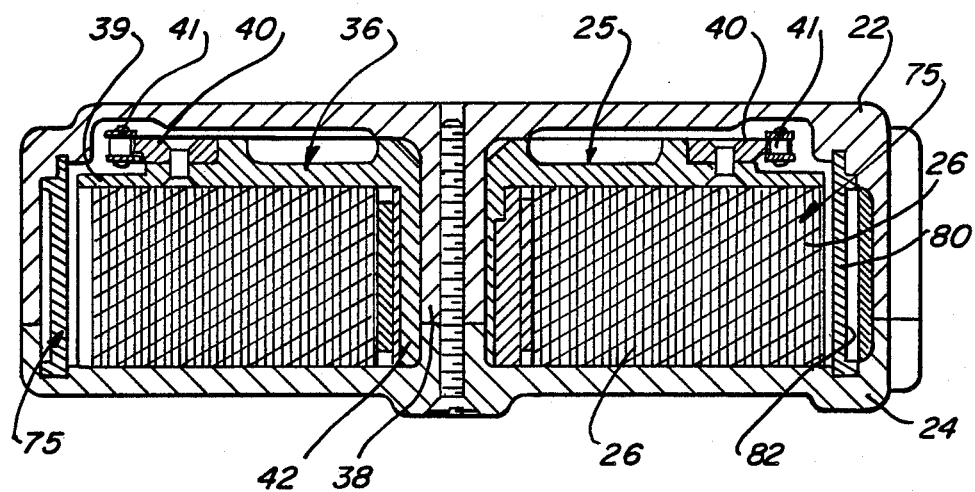
Fig_3

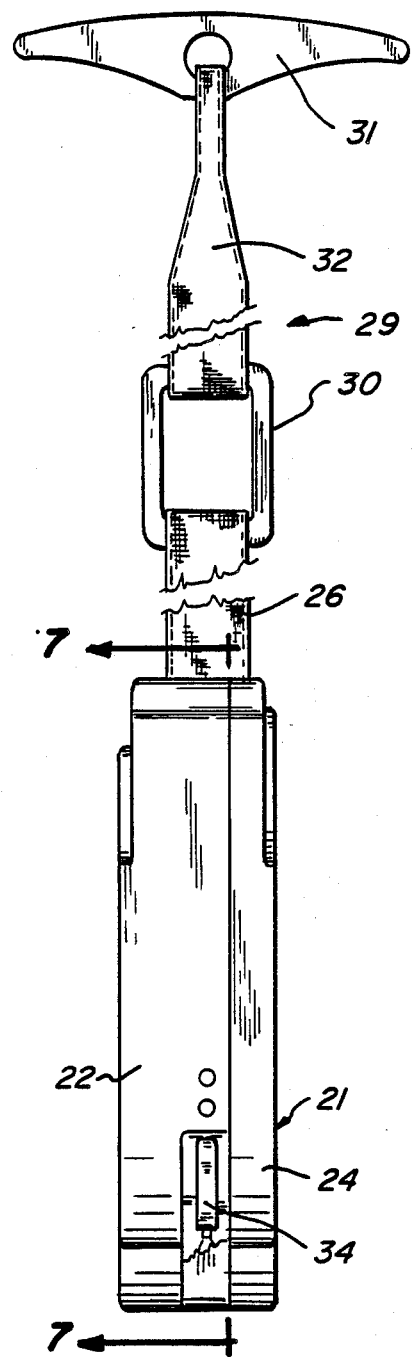
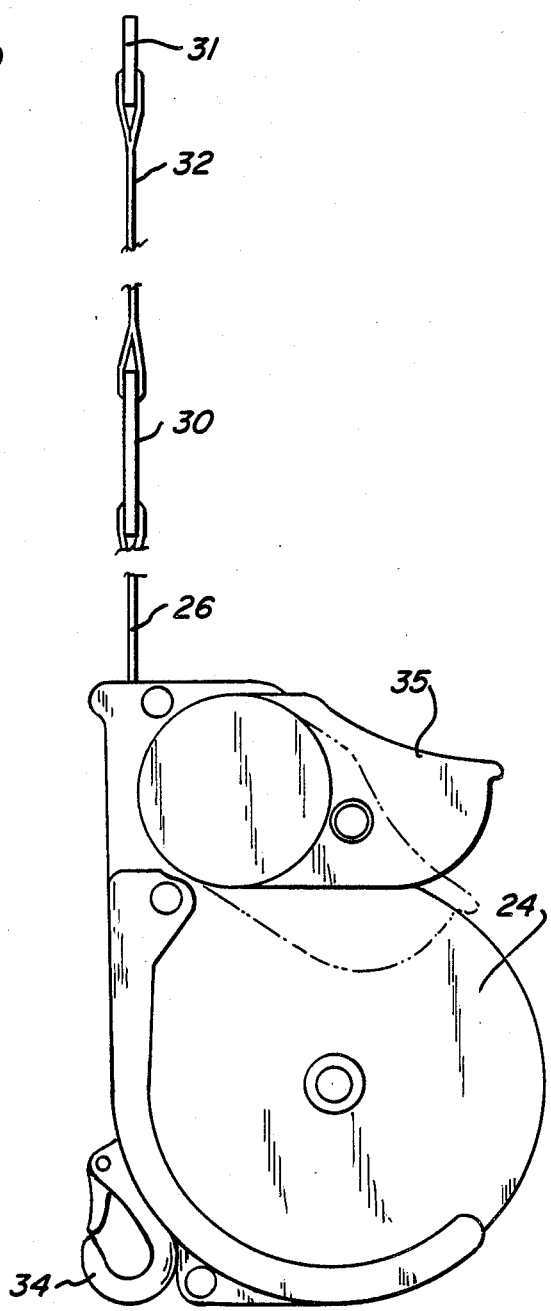
Fig_6    Fig_5

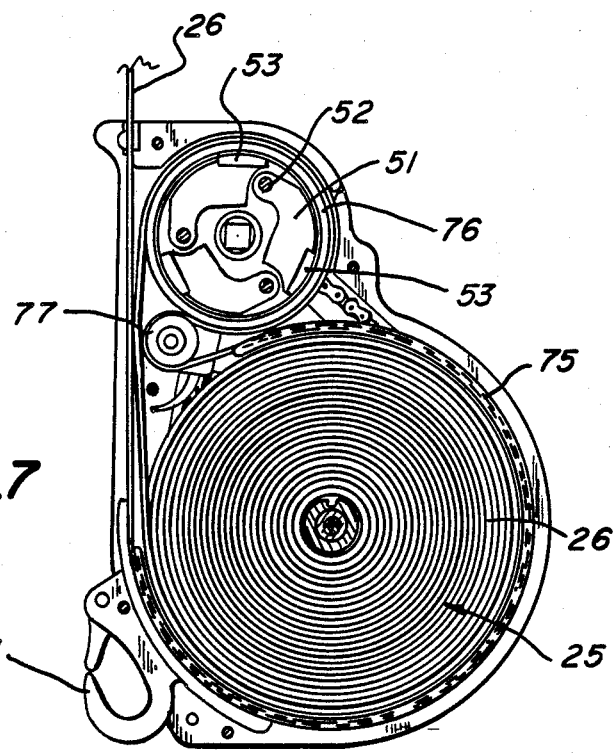
Fig_7
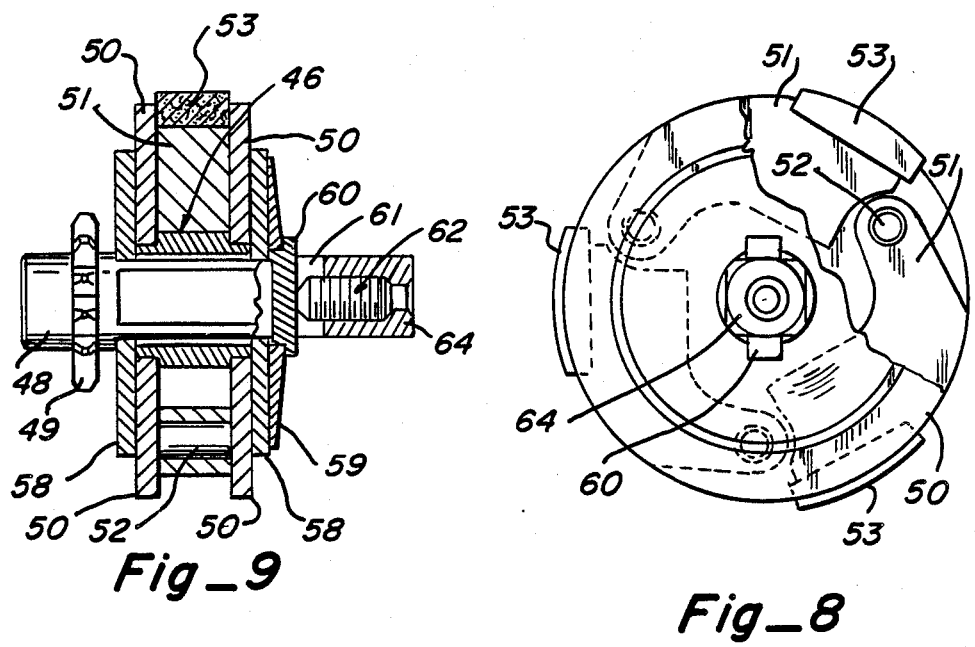
Fig_9    Fig_8

PERSONNEL LOWERING DEVICE

The present invention relates to personnel lowering devices, such as parachute associated devices, rapelling devices, emergency descent devices, aircraft ground emergency escape devices, and fire escape devices.

OBJECTS AND SUMMARY OF THE INVENTION

It is the principal object of the present invention to provide a new and efficient personnel lowering device for lowering an individual from a high to a low level in a controlled mode.

Another object of the present invention is to provide a personnel lowering device of the foregoing type which is small, light in weight, rugged and easily connected and used.

A further object of the present invention is to provide a personnel lowering device of the foregoing character which includes the ability to absorb energy in addition to automatic descent velocity control.

Other objects and advantages of the invention will become apparent as the following description proceeds.

The present is embodied in a small, light weight, rugged device which may be attached to a wearer's harness, belt, support strap, bucket seat or the like and includes a length of line having a securing means at one end, and wound at its other end on a reel or spool contained in the device housing The free end of the line is attached to a support from which it is desired to descend, such as a parachute hung in a tree. The housing is clipped to an appropriate belt, harness or the like. By actuating a control lever, a controlled descent may be provided.

The line is wound on a spool and, within the housing, passes over a force reducing capstan arrangement before it exits from the housing. A centrifugal brake, slip clutch and manual brake are provided on the spool. In the embodiment shown, the braking and clutch arrangement is provided by a centrifugal brake and friction clutch operatively connected to the reel by a small chain and sprocket The spool sprocket is a relatively large annular sprocket, while the brake sprocket is smaller providing approximately a 60-to-11 ratio between the spool and brake. The slip clutch is provided by cylindrical brake discs positioned outwardly of the brake side plates and biased against the brake side plates by a Belleville spring An annular manual brake plate is also provided on the brake side plates and is actuated by a cam arrangement controlled by an external spring biased control lever mounted on the housing.

The capstan arrangement is provided by a relatively large capstan plate surrounding the reel, a smaller capstan surrounding the brake cylindar and still smaller capstan nonrotatably mounted within the housing From the reel, the line is wrapped around the brake capstan, thence around the fixed capstan, and then around the reel capstan from which the line extends upwardly and outwardly of the housing. The capstan ratio provides an approximately 5-to-1 force reduction.

DESCRIPTION OF THE DRAWINGS

FIG. 1 is a diagramatic illustration showing one use of the present invention for lowering an individual from a parachute snagged in a tree.

FIG. 2 are a front elevation view of a lowering device embodying the present invention.

FIG. 3 is a section view taken substantially in the plane of line 3—3 on FIG. 2.

FIG. 4 is a section view taken substantially in the plane of line 4—4 on FIG. 2.

FIG. 5 is a rear elevation view of the device shown in FIG. 2.

FIG. 6 is a left side elevation view of the device shown in FIG. 5.

FIG. 7 is a section view taken substantially in the plane of line 7—7 on FIG. 6.

FIG. 8 is an enlarged fragmentary view of the centrifugal brake shown in FIG. 7.

FIG. 9 is a section view taken substantially in the plane of line 9—9 on FIG. 8.

DESCRIPTION OF THE PREFERRED EMBODIMENT

The present invention is embodied in a compact, lightweight, personnel lowering device containing sufficient line for a selected height descent. The device includes three force reducing fixed capstans about which the line is trained, a slip clutch, a centrifugal brake, and a manual brake with a descent control handle, which upon release automatically stops descent. The friction or slip clutch protects the line from an extreme shock force which might break the line. If a weight is dropped and its velocity becomes so high that the momentum would otherwise cause the descent line to snap, the friction clutch will allow the line to unwind from the spool without breaking. This is particularly important when using relatively inelastic line materials such as Kelvar, nylon and the line. Because most systems can be designed for a range of normal human weight, the device is effective for controlling descent from a predetermined maximum height within the length of the contained line.

Referring further to the drawings, the descent device 20 is embodied in a housing 21 formed by a body 22 and a cover 24. The joint between the body 22 and the cover 24 may be sealed after assembly of the unit. One portion of the housing houses a reel or spool assembly 25 containing a length of line 26. An adjacent portion of the housing houses a centrifugal brake and slip clutch assembly 28.

The free end of the line 26 is secured to a T-bar mounting assembly 29 by a connecting ring 30. The T-bar assembly includes a metal T-bar 31 secured to the mounting ring 30 by a short length of line 32.

For securing the descent device to a parachute harness, bucket seat, supporting strap or the like, (not shown) the assembly is provided with a latched hook 34. A control handle 35 is utilized to adjust the rate of descent. By pressing on the control handle 35, downward motion is achieved, while releasing the handle provides a dead-man safety function which stops descent.

In use, the T-bar 31 is wrapped around a support such as dangling parachute lines and inserted through the connecting ring 30. The descent device is then hooked to a harness or supporting (not shown) means by the hook 34. At this point, the parachute harness may be released from the parachute harness release buckles, thereby supporting the weight of the user on the line 26 of the descent device 20. By pressing on the handle 35, the user descends safely to the ground, as shown in FIG. 1.

The descent line 26 is wound on a spool or reel 36 which is in turn supported on a central shaft 38 defined between the body 22 and cover 24. One face 39 of the spool 36 is provided with an annular sprocket 40 for engaging a drive chain 41 which couples the spool assembly 25 to the brake and clutch assembly 28. The descent line 26 is secured at one end to the base sleeve 42 of the spool 36 and is wound around the spool 36 for storage.

To control the speed of rotation of the spool 36, and thereby the speed of feeding of the line 26 from the spool 36, the clutch and brake assembly 28 is operatively coupled to the spool 36 by the drive chain 41. The clutch and brake assembly 28 includes a slip clutch 42, a centrifugal brake 44, and a manual brake 45, as shown in FIGS. 4, 7, 8 and 9. The centrifugal brake 44 and slip clutch 42 are formed by a sleeve 46 drivingly secured to a shaft 48 journalled in the housing body 22 and cover 24. The shaft 48 mounts at one end a chain sprocket 49 adapted to drivingly receive the chain 41, thereby operatively connecting the spool assembly 25 and the brake and clutch assembly 28.

The centrifugal brake 44 includes a pair of spaced apart side plates 50 secured to the brake sleeve 46, which side plates 50 swingably support a plurality of brake arms 51, mounted between the plates on pivot pins 52. Each brake arm 51 carries, at its outward leading edge, a brake shoe or pad 53. The brake assembly 28 is mounted within a brake drum 54, the inner surface 55 of which forms a brake surface while the outer surface 56 defines a capstan. The brake drum 54 is non-rotably mounted within the tousing body 22 and cover 24.

The slip clutch 42 comprises a pair of brake disks 58 positioned outwardly of the brake side plates 50 and biased against the brake side plates by a Belleville spring 59. The Belleville spring is adjustable, as shown in FIG. 9, by means of a loading bar 60 extending through a slot 61 in the drive shaft 48. The bar 60 is adjustably positioned against the Belleville spring by a set screw 62 threadably engaged within the adjacent end 64 of the drive shaft 48 and accessible from the shaft end 64 as shown in FIG. 8. By adjusting the pressure of the Belleville spring 59 on the brake disc 58, the centrifugal brake 44 rotates with the shaft 48 as driven by the sprocket, while the shaft can rotate independently of the cylindrical brake 44 when the load on the line exceeds a predetermined load. Under such predetermined load, the reel 36 can rotate and allow the line 26 to feed slowly out of the housing, with the descent rate of the load controlled by the manual and centrifugal brakes.

For manually controlling the rate of rotation of the brake and clutch mechanism, and thus the rate of rotation of the line reel assembly 25, a normally operative manual brake 45 is provided which may be released by pressing on a control handle 65. The manual brake 45 comprises a pair of annular brake disks 66 surrounding the cylindrical brake discs 58 and bearing on the peripheral surfaces of the brake side plates 50 radially outwardly of the brake discs 58. One of the annular brake discs 66 acts between the adjacent side plate 50 and the housing body 22, as shown in FIG. 4, while the other annular brake disc 66 is biased by a cam mechanism 68 controlled by the control handle 65. The cam mechanism acts on the annular brake disc 56 through a wave spring 69. The cam mechanism 68 include an outer cam ring 70 rotated by the normally biased action of the handle 65 to force an inner cam ring 71 against the wave spring 69 to effect a braking pressure on the annular brake disc 66.

The control handle is journalled for rotation about the shaft 48 and is biased to its braking position by a coil spring 72. A cam pin 74 engages between the control handle 65 and the outer cam ring 70 to actuate the ring cam mechanism 68 to release the annular brake discs 66 when the handle 65 is pressed against the force of the coil spring 72 and actuate the brake when the handle 65 is released. Again, should the load on the line 26 exceed a predetermined load limit, the slip clutch 42 will allow the sprocket 49 to rotate as the reel 36 rotates to slow the descent of the excess load.

The resisting tension in the line 26 between the reel 36 and the load point applied line tension is reduced by training the line 26 over a capstan assembly. In the embodiment shown in FIG. 7, three capstans are used. One capstan 75 surrounds the reel 36, one capstan 76 surrounds the brake assembly, and a third capstan 77 is fixed in the housing intermediate the reel capstan 75 and brake capstan 76.

The capstan 75 surrounding the spool or reel 36, is formed by an annular capstan ring 80 mounted within the housing body 22 and cover 24 to define therewith an enclosed annular channel 81. The outer face or surface 82 of the capstan ring 80 defines the capstan 75 which frictionally receives and support the line 26. The line 26 wraps around the capstan over an angle in excess of 270° or about 1.7 pi radians. A second capstan 66 is defined around the clutch and brake assembly, and is formed by the exterior surface 56 of the brake drum 54.

In operation, a cable or line 26 stored on the reel 36 extends from the reel around the clutch/brake capstan 76, thence around the smaller fixed capstan 77, and finally around the peripheral capstan 75 surrounding the reel 25, from which capstan 75 the line 26 passes out of the descent device. The free end of the device is fixed to a support point and subjected to applied line tension. Resisting line tension is the downward pull on the descent device at the hook, and the tension in the line 26 at the reel 36. The ratio of applied line tension ($T_1$) to resisting line tension ($T_2$) as determined by the following formula:

$$\frac{T_1}{T_2} = e^{\mu \alpha}$$

where $\mu$ is the coefficient of friction of the line in contact with the capstan surfaces and $\alpha$ is the total angle of wrap of the line on the capstan, measured in radians. The line tension ratio is also the ratio of energy absorbed in the capstans to energy absorbed in the device that produces the resisting tension. Thus, if the capstan ratio is 5 to 1, five times as much energy is absorbed in the capstans as in the body or device that produces the resisting line tension. The capstans are thus the main energy absorbers and the control devices, that is the clutch and brake assemblies, can be proportionately smaller. Energy is absorbed in the capstans and converted to heat. By varying the size of the capstans, the total angle of wrap of the line on the capstans can be varied thereby changing the capstan ratio.

An illustrative use of the present invention is shown in FIG. 1 which illustrates a parachute 80 snagged in a tree 81 and suspending the user 82 a substantial distance above the ground. The user 82 secures the lowering device 21 to his parachute harness and secures the lowering line 26 to the parachute 80. The user can then release the parachute from his harness and begin lowering to the ground as show at 82a with stops and starts at will until the user is safely on the ground as shown at 82. At this point the user may release the lowering device from the parachute harness.

While an certain illustrative embodiment of the present invention has been shown in the drawings and described above in considerable detail, it should be understood that there is no intention to limit the invention to the specific form disclosed. On the contrary, the intention is to cover all modifications, alternative constructions, equivalents and uses falling within the spirit and scope of the invention as expressed in the appended claims.

We claim:

1. A personnel descent control device comprising, in combination, a housing adapted to be secured to a person intending to descend from a higher to a lower elevation, a line adapted to be secured at one end to a fixed point at said higher elevation, means on said line for securing said line to said point, a reel rotatably mounted in said housing and containing a supply of said line, said reel being adapted to rotate as said line is extended and the person descends from the higher elevation to the lower elevation, a brake assembly mounted in said housing and including a centrifugal brake, means operatively coupling said reel to said centrifugal brake for controlling the rate of rotation of said reel, a mechanical brake on said housing for manually controlling the rate of rotation of said line supply reel, and means defining a plurality of capstans mounted within said housing about which said line is trained for absorbing energy and providing a capstan ratio effective to reduce applied line tension thereby slowing the descent of a person supported by said descent device.

2. A personnel descent control device comprising, in combination, a housing adapted to be secured to a person intending to descend from a higher to a lower elevation, a line adapted to be secured at one end to a fixed point at said higher elevation, means for securing said line to said point, a reel rotatably mounted in said housing and containing a supply of said line, said reel being adapted to rotate as said line is extended and the person descends from the higher elevation to the lower elevation, a brake assembly mounted in said housing and including a centrifugal brake, means operatively coupling said reel to said centrifugal brake for controlling the rate of rotation of said reel and thereby the rate of descent, a mechanical brake on said housing for manually controlling the rate of rotation of the supply reel, a slip clutch operatively connecting said centrifugal brake and said reel whereby said reel rotates relative to said centrifugal brake when the load on the descent device exceeds a predetermined load, and means defining a plurality of capstans about which the line is trained for absorbing energy thereby slowing the descent of a person supported by said descent device.

3. In a descent device for controlling the rate of descent of a person from a higher elevation to a lower elevation, comprising means for securing said line to a point at said higher elevation, a storage reel in said descent device for storing a length of said line, a plurality of capstans in said descent device about which said line is trained for absorbing energy from said line to provide a capstan ratio effective to reduce applied tension in said line at said reel, means for securing said descent device to said person, a centrifugal brake for controlling the rate of rotation of said line storage reel, and a manual brake for manually controlling the rate of rotation of said reel.

4. A device as defined in claim 3 wherein said line is trained about said capstans over an included angle of between about 4 pi and about 5 pi radians.

5. A device as defined in claim 3 wherein said manual brake is normally spring biased to a braking position.

6. A device as defined in claim 3 wherein said capstans comprise a large capstan surrounding said line storage reel, a relatively smaller capstan surrounding said centrifugal brake, and a still smaller capstan comprising a fixed capstan cylinder intermediate said reel capstan and said brake capstan, said line being trained from said reel about said brake capstan, thence around said fixed capstan and thence around said reel capstan.

7. A device as defined in claim 3 wherein said centrifugal brake includes a Belleville spring biased slip clutch.

8. A personnel descent control device comprising, in combination, a housing adapted to be secured to a person intending to descend from a higher to a lower elevation, a line adapted to be secured at one end to a fixed point at said higher elevation, means on said line for securing said line to said point, a reel rotatably mounted in said housing and containing a supply of said line, said reel being adapted to rotate as said line is extended and the person descends from the higher elevation to the lower elevation, a brake assembly mounted in said housing and including a centrifugal brake, means operatively coupling said reel to said centrifugal brake for controlling the rate of rotation of said reel, a mechanical brake on said housing for manually controlling the rate of rotation of said line supply reel, and means defining a plurality of energy absorbing capstans mounted within said housing and about which said line is trained, said capstan means comprising a first capstan circumferentially surrounding said centrifugal brake for frictionally engaging said line as it exits from said reel, a second capstan fixed in said housing intermediate said reel and said centrifugal brake for receiving said line from said first capstan and frictionally engaging said line, and a third capstan circumferentially surrounding said reel for receiving said line from said capstan and frictionally engaging said line, said capstan engaging said line over a circumferential angle providing a capstan ratio effective to reduce applied line tension for slowing the descent of a person supported by said descent device.

9. A device as defined in claim 8 wherein said line is trained about said capstans over an include angle of between about 4 pi and about 5 pi radians.

10. A device as defined in claim 9 wherein said manual brake is normally spring biased to a braking position.

11. A device as defined in claim 10 wherein said centrifugal brake includes a Belleville spring biased slip clutch.

* * * * *